US012626616B2

(12) United States Patent
Ennis

(10) Patent No.: US 12,626,616 B2
(45) Date of Patent: May 12, 2026

(54) COLOR-CODED CABLE AND ETHERNET PORT IDENTIFICATION LABELS

(71) Applicant: Vaughn Lee Ennis, Silver Spring, MD (US)

(72) Inventor: Vaughn Lee Ennis, Silver Spring, MD (US)

( * ) Notice: Subject to any disclaimer, the term of this patent is extended or adjusted under 35 U.S.C. 154(b) by 0 days.

(21) Appl. No.: 19/189,570

(22) Filed: Apr. 25, 2025

(65) Prior Publication Data

US 2025/0252871 A1 Aug. 7, 2025

Related U.S. Application Data

(63) Continuation-in-part of application No. 18/885,850, filed on Sep. 16, 2024, now abandoned.

(60) Provisional application No. 63/582,949, filed on Sep. 15, 2023.

(51) Int. Cl.
*G09F 3/00* (2006.01)
*G09F 3/02* (2006.01)

(52) U.S. Cl.
CPC .... *G09F 3/0295* (2013.01); *G09F 2003/0222* (2013.01); *G09F 2003/023* (2013.01)

(58) Field of Classification Search
CPC ..... H01B 13/344; H01B 7/368; G09F 3/0295; G09F 2003/0222; G09F 2003/023
See application file for complete search history.

(56) References Cited

U.S. PATENT DOCUMENTS

| | | | | | |
|---|---|---|---|---|---|
| 1,563,371 | A | * | 12/1925 | Jones | G09F 3/14 40/628 |
| 2,831,277 | A | * | 4/1958 | Harry | G09F 3/10 206/820 |
| 4,578,136 | A | * | 3/1986 | Brown | G09F 3/10 156/215 |
| 4,609,208 | A | * | 9/1986 | Wrobel | H01B 7/368 283/81 |
| 4,947,568 | A | * | 8/1990 | De Barbieri | G09F 3/16 40/316 |
| 5,533,917 | A | * | 7/1996 | Schmitz | H01R 13/60 439/488 |
| 5,693,911 | A | * | 12/1997 | Sydow | H05K 5/0252 283/117 |
| 5,862,774 | A | * | 1/1999 | Moss | G09F 3/10 116/200 |
| 5,951,057 | A | * | 9/1999 | Spector | B42D 15/045 283/117 |

(Continued)

*Primary Examiner* — David R Dunn
(74) *Attorney, Agent, or Firm* — Michael L. Greenberg, Esq.; Greenberg & Lieberman, LLC

(57) ABSTRACT

Cable and Ethernet Port ID Labels that have an adhesive backing and are both the same color for easy re-connection to the correct port are described. The labels allow the ethernet port and cable ends to be color coded so that reconnection can be made to the proper port if the cable is disconnected for any reason. Labels configured to be affixed to the ethernet plug of the ethernet (CAT5 or similar, such as fiber optic cable, coaxial cable, or other conventional telecom cabling) cable are precision cut such that they wrap around the plastic RJ 45 portion of the plug without interfering with the capacity of connection of the plug to the port. The adhesive is preferably designed to adhere to plastic, such as that of the wall plate of the port, and that of the plastic of the plug disposed on the cable(s) themselves.

6 Claims, 10 Drawing Sheets

(56) References Cited

U.S. PATENT DOCUMENTS 6,112,665 A * 9/2000 Teter ........................ B42D 1/00
101/494
6,196,593 B1 * 3/2001 Petrick ...................... G09F 3/10
40/310
6,382,676 B1 * 5/2002 Cochran ................... G09F 3/04
283/79
6,416,612 B1 * 7/2002 Lerner ...................... G09F 5/04
156/289
6,929,837 B2 * 8/2005 Morrison ................ B32B 27/32
428/40.1
7,134,200 B2 * 11/2006 Boldy .................. H01R 13/465
29/857
7,513,071 B2 * 4/2009 Miyake ..................... G09F 3/10
439/367
7,547,227 B1 * 6/2009 Gibson ................ H01R 13/465
439/491
7,687,712 B2 * 3/2010 Price ........................ H02G 3/14
174/67
7,745,740 B2 * 6/2010 Smith ................... G09F 3/0295
174/653
7,752,787 B2 * 7/2010 Duffy ...................... G09F 3/205
40/673
7,752,788 B1 * 7/2010 Sun ...................... H01R 12/716
439/78
8,333,609 B2 * 12/2012 Sato ....................... H01R 13/64
381/80
8,739,444 B2 * 6/2014 Poole ....................... G01B 3/34
283/81
D895,008 S * 9/2020 Cleghorn ....................... D19/26
2002/0092221 A1 * 7/2002 DaRif ....................... G09F 5/04
40/674
2011/0024157 A1 * 2/2011 Sugimura .............. H01B 7/361
174/112
2012/0198738 A1 * 8/2012 Olivarez ............... G09F 3/0295
156/185
2013/0135616 A1 * 5/2013 Abuelsaad .............. G01J 3/443
356/402
2013/0138839 A1 * 5/2013 Abuelsaad ............. H04Q 1/136
710/16
2014/0082980 A1 * 3/2014 Sherman ................... G09F 3/08
40/662
2016/0321961 A1 * 11/2016 Horne ....................... G09F 3/10
2017/0025046 A1 * 1/2017 Butts ..................... G09F 3/0295
2017/0105305 A1 * 4/2017 Adams ..................... H05K 7/10
2018/0286289 A1 * 10/2018 Liversidge ........... H01R 13/465
2019/0035310 A1 * 1/2019 Nordquist ................. B32B 3/08
2019/0287429 A1 * 9/2019 Dawson .................. G09F 1/065
2019/0318845 A1 * 10/2019 Wang ................... H01R 13/465
2020/0059018 A1 * 2/2020 Cerniglia ............. H01R 9/2475
2020/0286408 A1 * 9/2020 Hudak .................... G09F 3/205
2020/0394938 A1 * 12/2020 Cerniglia .............. G09F 3/0295
2021/0213758 A1 * 7/2021 Nakashima .............. B41M 3/00
2022/0013042 A1 * 1/2022 Mizutani ................... G09F 3/10
2022/0172648 A1 * 6/2022 Dacey ....................... G09F 3/04
2022/0415213 A1 * 12/2022 Jour .......................... G09F 3/02
2024/0046821 A1 * 2/2024 Cannon ..................... G09F 3/02

* cited by examiner

COLOR-CODED CABLE AND ETHERNET PORT IDENTIFICATION LABELS

CONTINUITY

This application is a continuation-in-part application of non-provisional application Ser. No. 18/885,850, filed on Sep. 16, 2024, and of provisional application No. 63/582,949, filed on Sep. 15, 2023, and priority is claimed thereto.

FIELD OF THE PRESENT INVENTION

The present invention relates to cable management, and more specifically relates to a system and method for labeling cables to corresponding ports to effectively ensure that they can be matched in the event that cables are unplugged, moved, or replaced.

BACKGROUND OF THE PRESENT INVENTION

In most business environments there exist extensive computer networks with numerous cables running throughout the network. When a network cable gets unplugged from the wall outlet, customers (or users) often do not remember which port they removed the cable from which can often lead to the cable being reinstalled in the incorrect port on the wall outlet or other interconnection port. In addition, cables can also be inadvertently removed by cleaning crew or during an emergency equipment move. Many times, wall jacks or ports are configured to the specific MAC address of the connected device, and if not reconnected to the preconfigured port, they will not communicate and result in the device showing as "offline."

There have been previous devices and systems which have been developed that attempted to provide a means of labeling the cables themselves, such as what component, server, or device the cable is to be connected. However, systems presently available on the market do not cater to labeling the port as well as the cable such that they may match and easily be reconnected without necessitating labeling the component itself, which may present a privacy issue.

Therefore, what is desired a device that is directed at overcoming shortcomings in conventional systems. In a preferred embodiment, the present invention allows the ethernet port and cable male end(s) to be color coded so that reconnection can be made to the proper port if the cable is disconnected for any reason.

Thus, there is a need for a new system and device configured to facilitate the matching of specific cables to specific components and ports without detailing specifics about the device to which the cable or port is connected or directed.

SUMMARY OF THE INVENTION

The present invention is directed towards cable and ethernet port ID labels that are both the same color for easy re-connection. The labels are equipped with adhesive backing. The present invention allows the ethernet port and cable end (male plug) to be color coded so that reconnection can be made to the proper port if the cable is disconnected for any reason.

BRIEF DESCRIPTION OF DRAWINGS OF THE PRESENT INVENTION

The present invention will be better understood with reference to the appended drawing sheets, wherein.

DETAILED DESCRIPTION OF THE PRESENT INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims. Broadly, an embodiment of the present invention provides color-coded cable identification (ID) labels (10) and ethernet port ID labels (20) that have an adhesive backing (30) and are both the same color for easy and correct re-connection of the cables. Wire labels, referenced as adhesive strips (40) are also optionally present to facilitate identification in the event that the male ethernet (CAT5 or other telecom cable plug) plug is compromised.

As stated above, when a network cable gets unplugged from, for example, a wall outlet equipped with multiple separate Ethernet ports, customers often don't remember from which port they removed the Ethernet cable. In addition, many times wall jacks or ports are configured to the specific MAC address of the connected device and, if the cable of the correct device is not reconnected to the preconfigured port, they will not communicate, resulting in the device showing as "offline." The invention claimed here solves these and other problems.

The present invention allows the ethernet port and cable end to be color coded so that reconnection can be made to the proper port if the cable is disconnected for any reason, such as by the cleaning crew or during an emergency equipment move.

The present invention is an improvement on what currently exists. With 15 years in hospital environs and large and small business locations, there does not exist any individual port labels.

Figure 1:
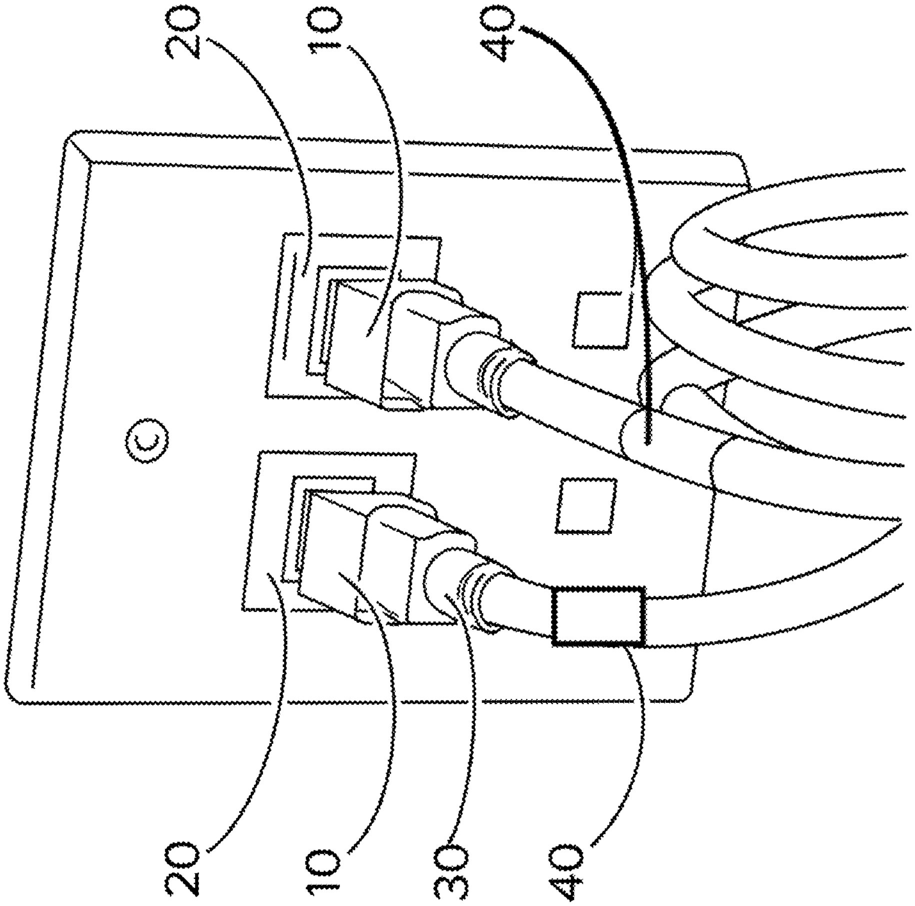
FIG. 1 depicts a preferred embodiment of the cable and port ID labels of the present invention.
Figure 2:
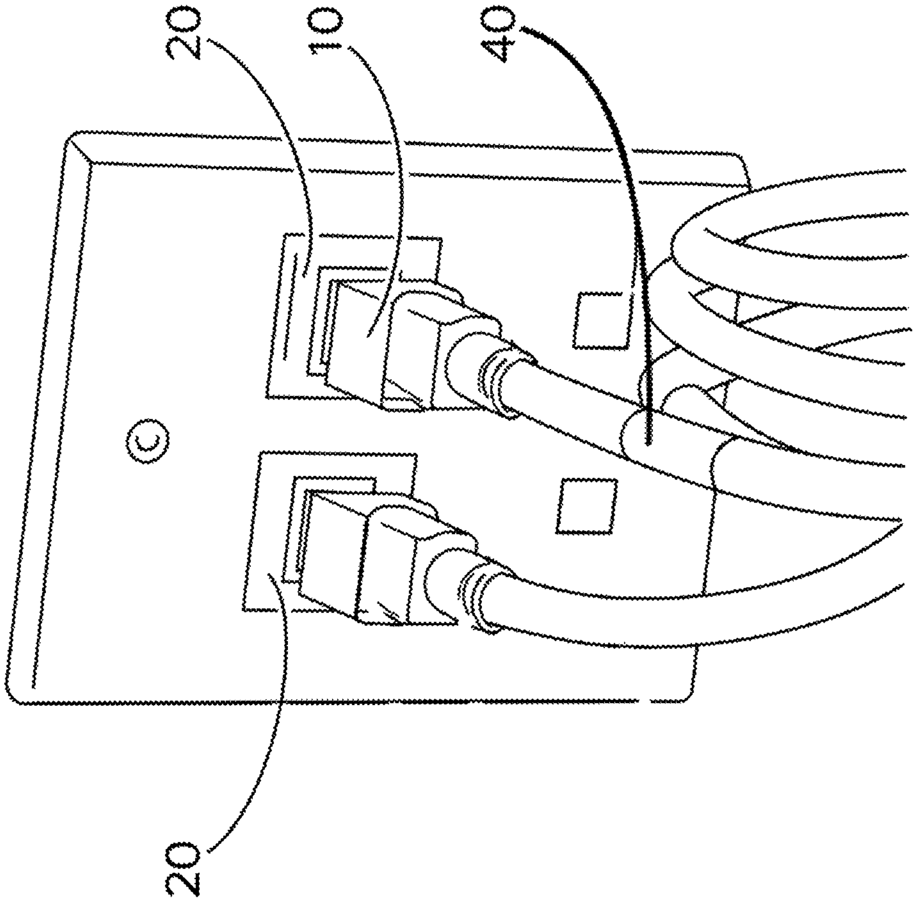
FIG. 2 depicts the preferred embodiment of the cable and port ID labels of the present invention, as shown installed.
Figure 3:
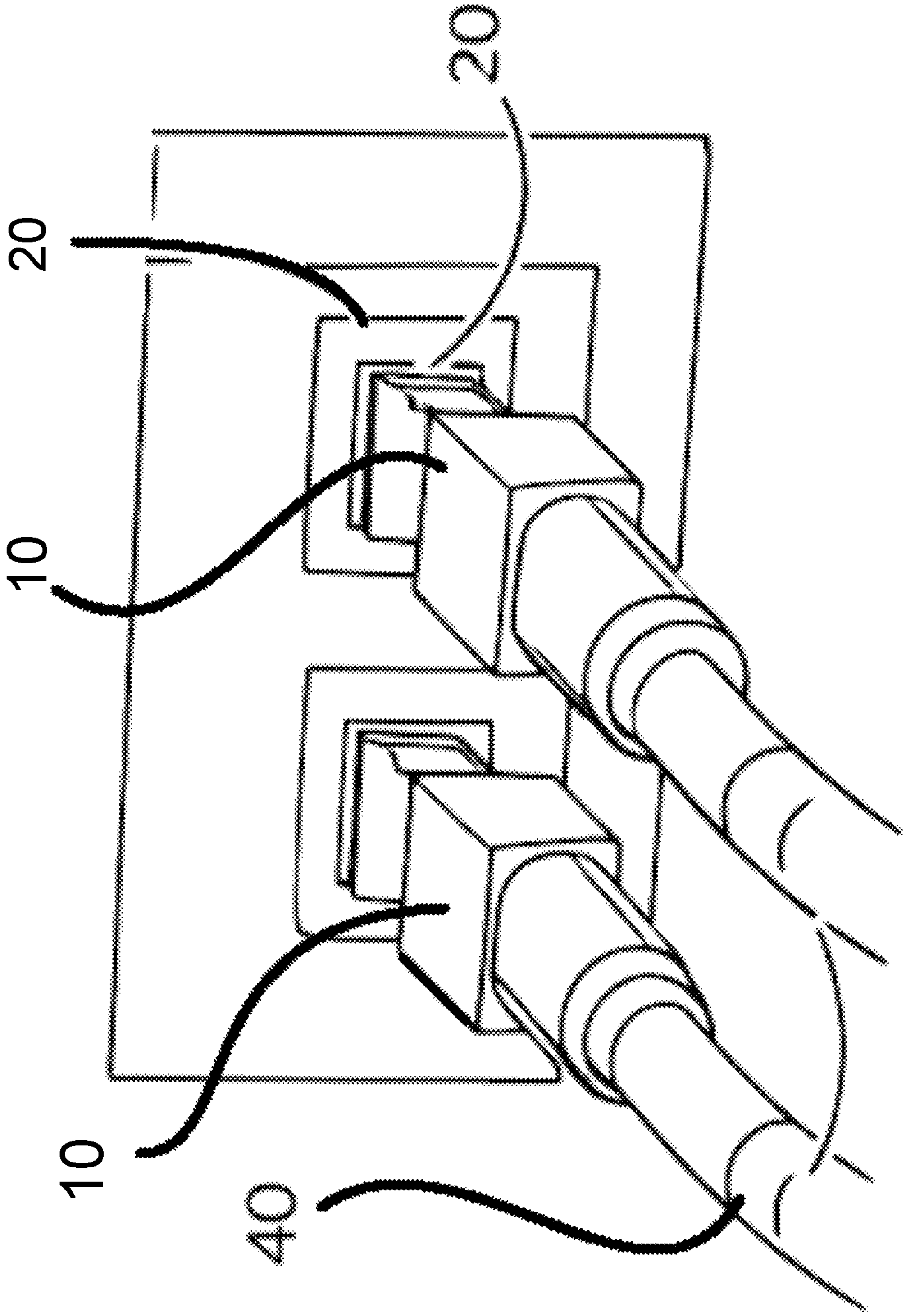
FIG. 3 depicts a preferred embodiment of the cable and port ID labels of the present invention.
Figure 4:
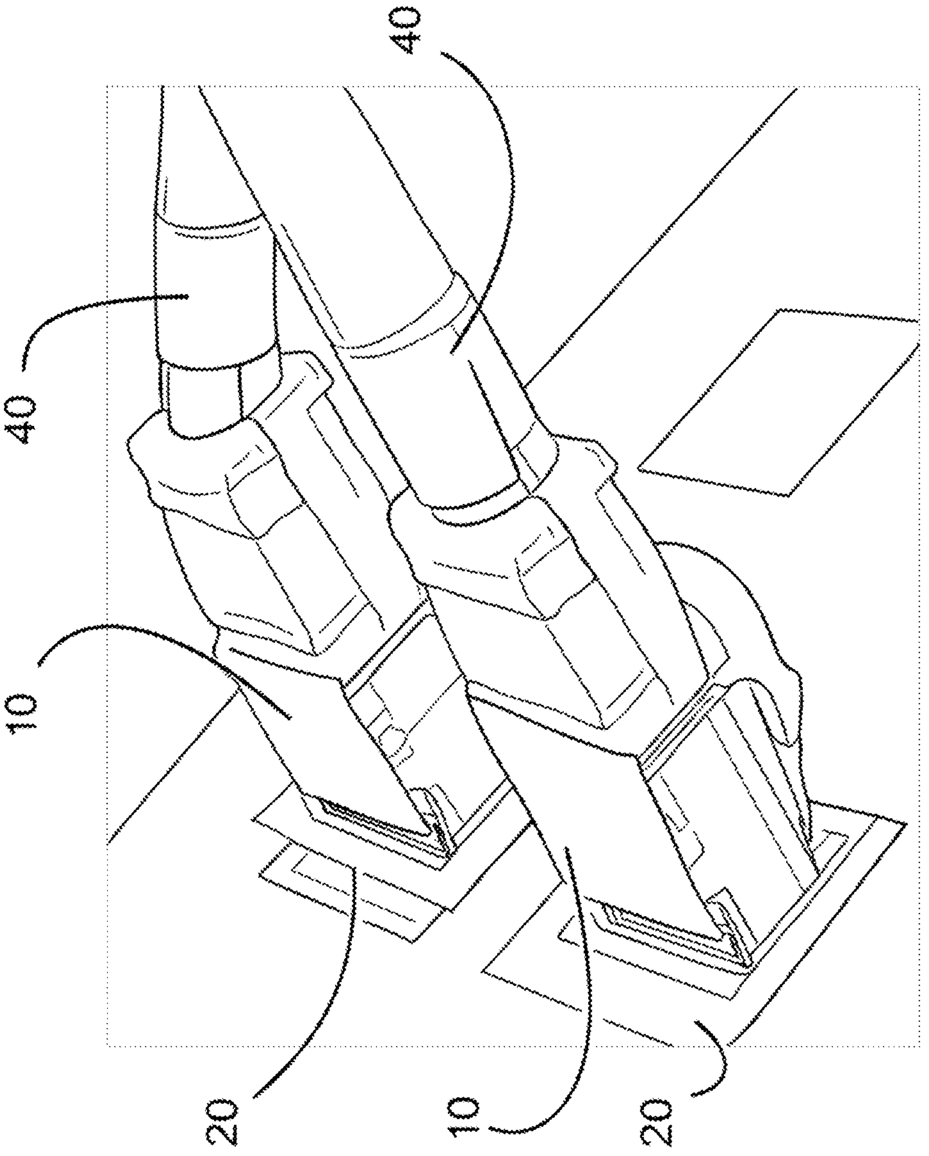
FIG. 4 depicts a preferred embodiment of the cable and port ID labels of the present invention.
Figure 5:
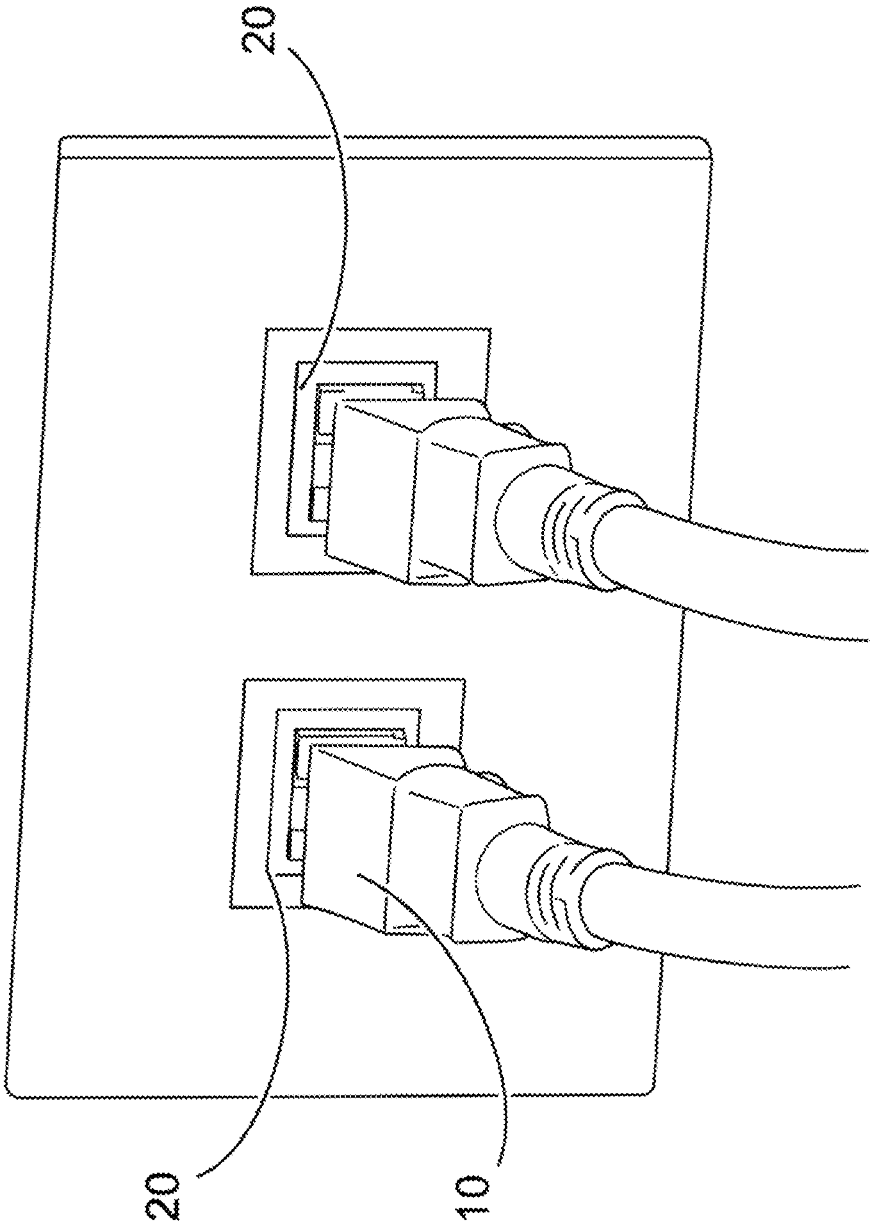
FIG. 5 depicts a preferred embodiment of the cable and port ID labels of the present invention.
Figure 6:
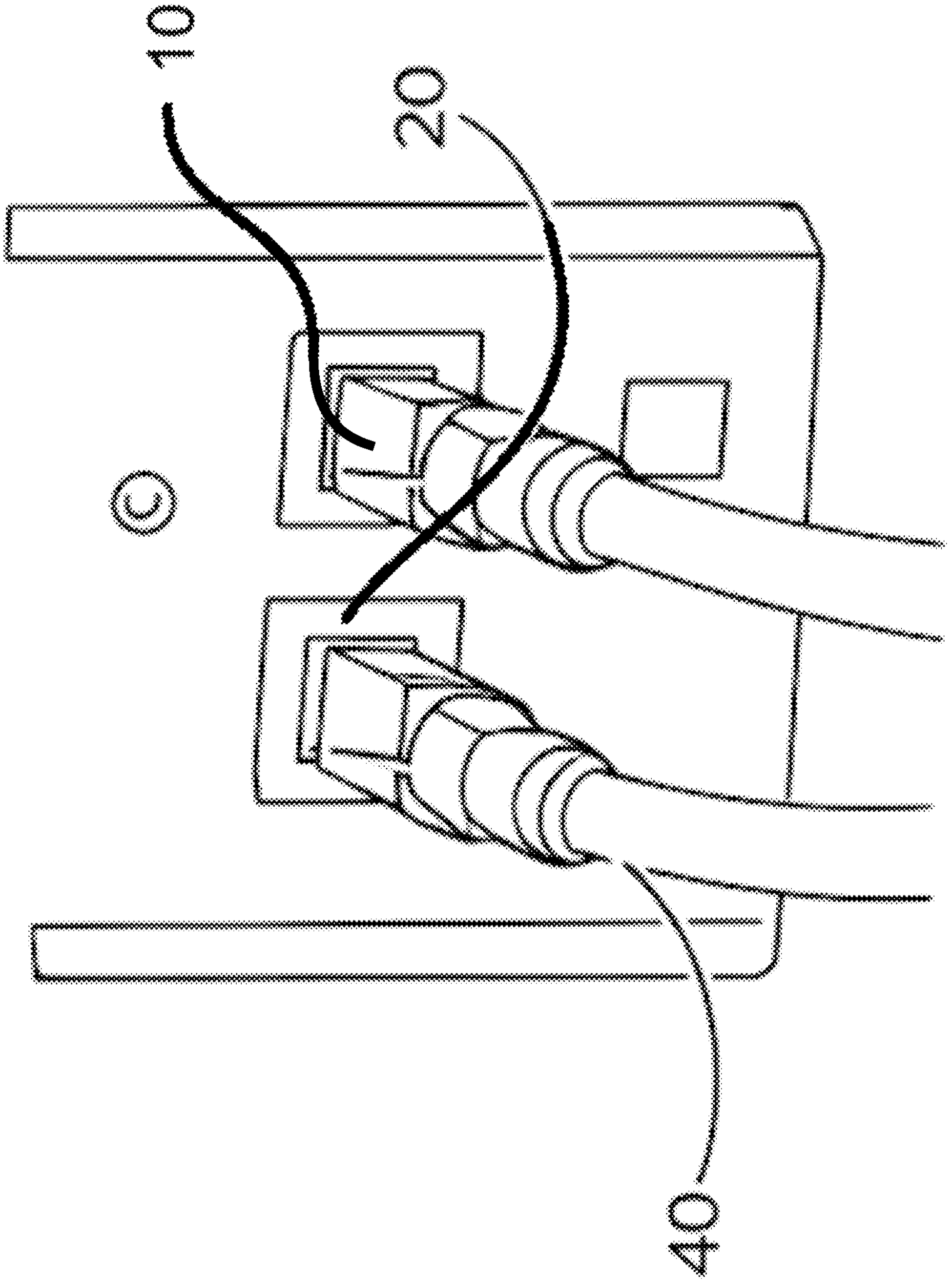
FIG. 6 depicts a preferred embodiment of the cable and port ID labels of the present invention.
Figure 7:
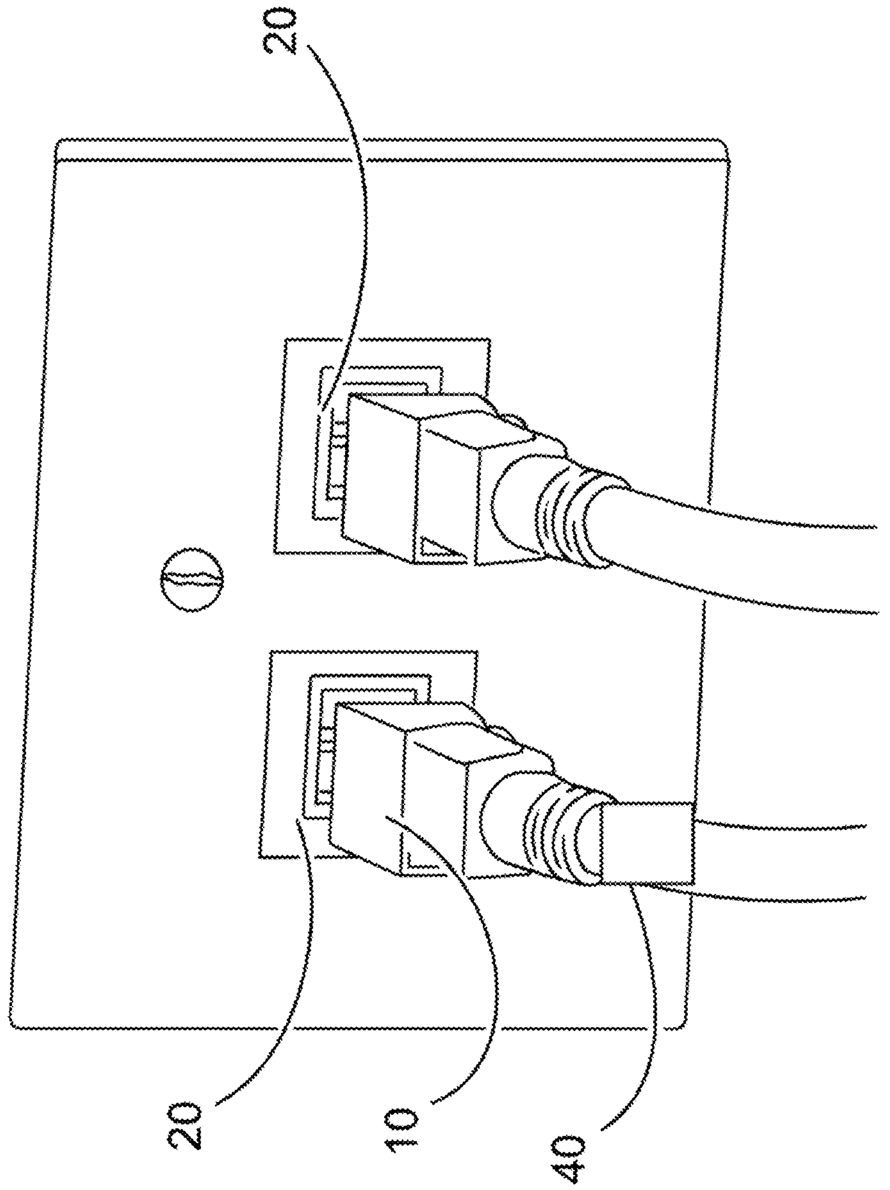
FIG. 7 depicts a preferred embodiment of the cable and port ID labels of the present invention.
Figure 8:
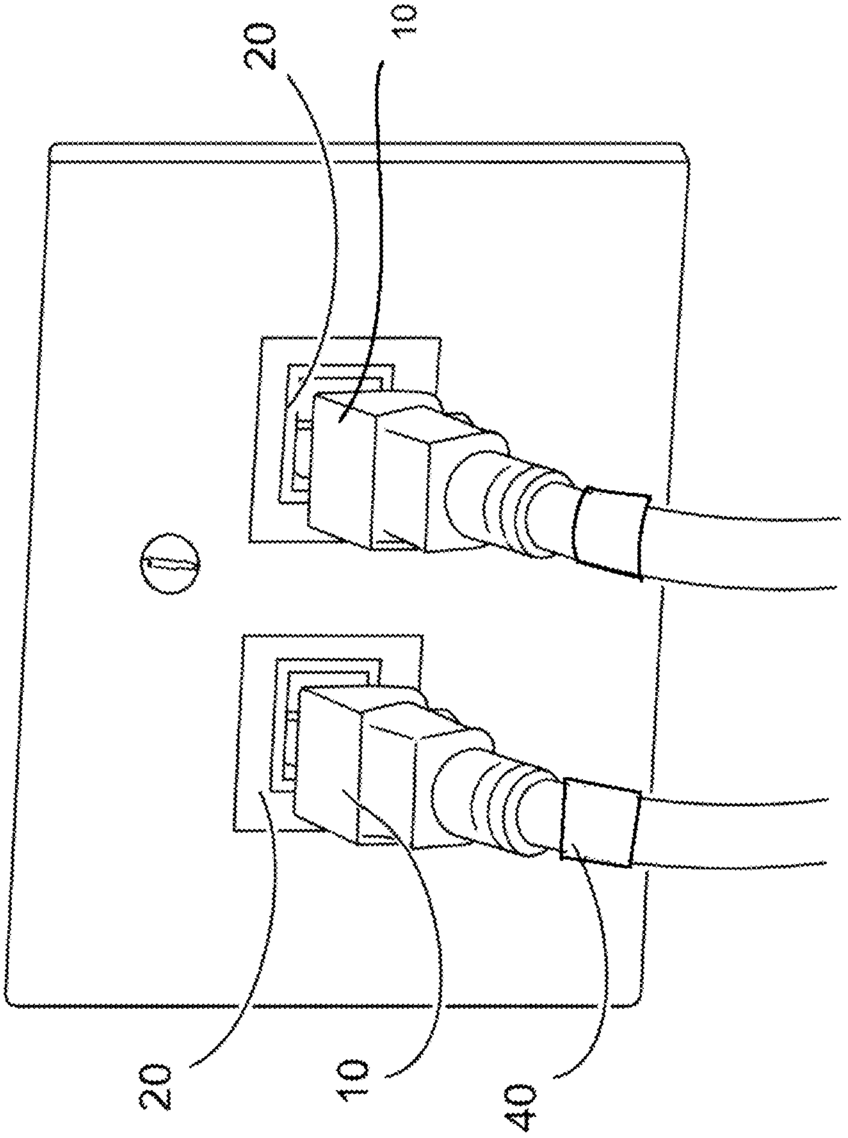
FIG. 8 depicts a preferred embodiment of the cable and port ID labels of the present invention.
Figure 9:
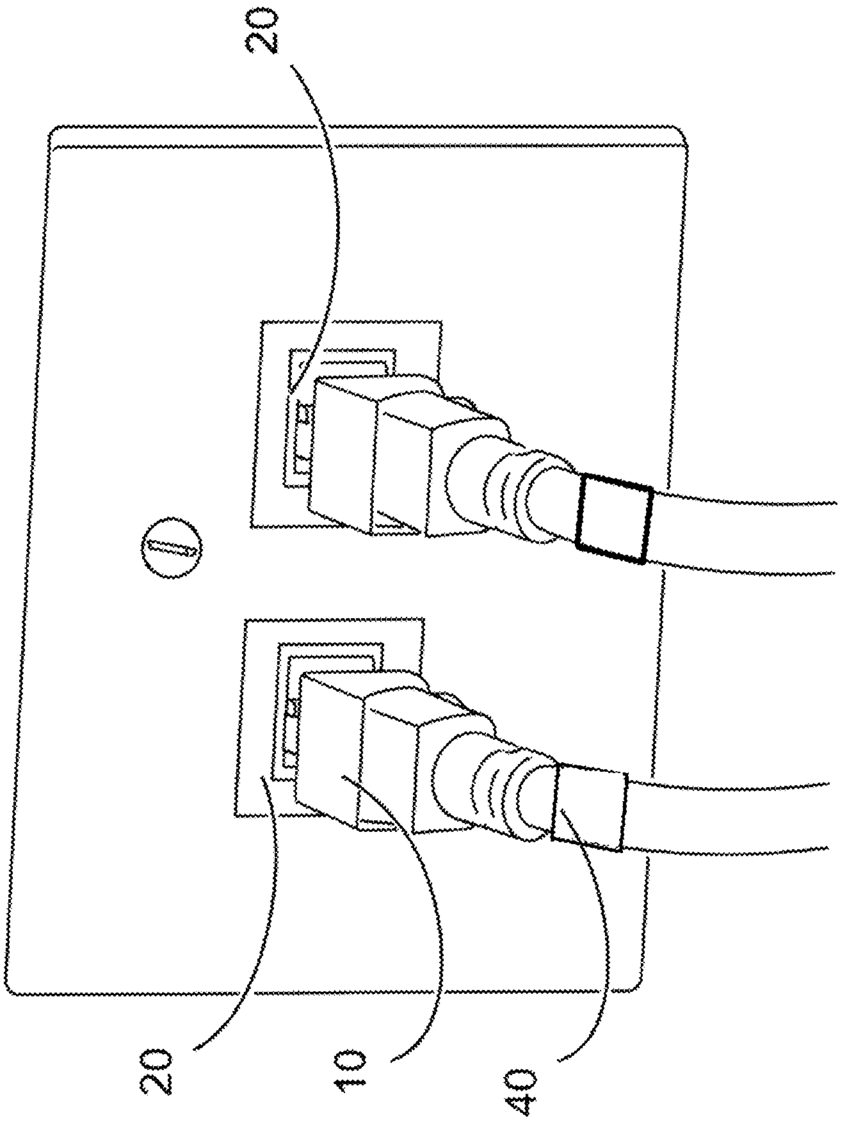
FIG. 9 depicts a preferred embodiment of the cable and port ID labels of the present invention.
Figure 10:
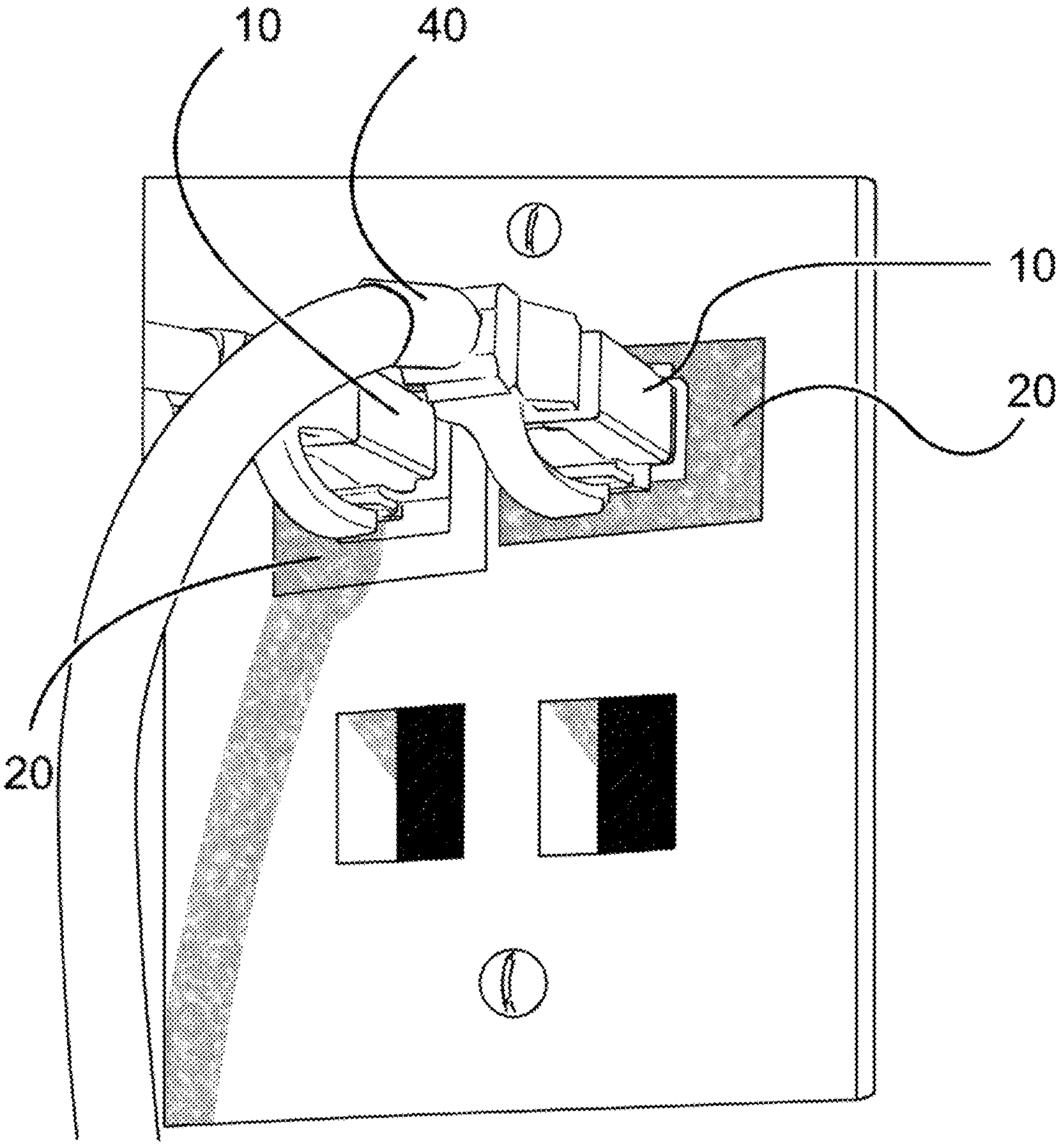
FIG. 10 depicts a preferred embodiment of the cable and port ID labels of the present invention.

In a preferred embodiment, the present invention included the following components:

1. An adhesive-backed rectangle of a colored label with a smaller rectangle pre-cut in the middle of it. In a preferred embodiment, the large rectangle measures ¾ inch high by 11/16 inch wide OD. The dimensions could be larger if space allows. This embodies the wall plate port label (20) of the present invention as shown in FIG. 2.

2. The smaller adhesive-backed rectangle of a colored label that was in the middle of the larger rectangle and is pre-cut for easy removal. In a preferred embodiment, the small rectangle measures ½ inch high by ½ inch wide. The dimensions could be larger if space allows. This embodies the cable male plug label (10).
3. One adhesive-backed strip, pre-cut in half vertically, which in a preferred embodiment measures ¾ inch high by 11/16 inch wide, referenced as adhesive strips (40). The dimensions could be larger if space allows. These strips embody complimentary components to the cable male plug label (10).

Relationship Between the Components

As described herein, and as seen in the Figures, the large rectangle (20) can be applied to the wall plate and internet connector. The small rectangle (10) (from the middle of the large rectangle) and the two adhesive strips (40) can be attached to the RJ 45 connector at the end of the cable.

How the Invention Works

Many of the shortcomings of conventional systems can be overcome by identifying which cable goes into the port that has been configured to work with only that cable, through the use of matching color labels on the cable end (RJ 45 or similar—such as fiber optic cable, coaxial cable, or similar conventional telecom cabling) and the wall plate.

A preferred method of making the components of the present invention will now be described. Using an adhesive backed colored sheet, or roll, cut out the four pieces as previously described. Next, cut the large rectangle to size and then cut out the middle piece to its size. Next, cut the two strips from the same sheet to their size. The items could alternately be disposed on a roll, (either one color or multiple colors) and be printed by a dispensing device. Alternately, the two strips could be cut from one longer strip of material.

The two rectangles are critical, but the two strips could be redundant, but would help if the small rectangle was peeled off of the RJ 45 connector. These elements can be used on a single outlet or on outlets with multiple outlets. These elements could be used on network devices or hospital equipment. In addition, by utilizing a company's trademark color or letter etc. on the labels, that could be another revenue stream.

Method of Use of the Present Invention

The port labels (20) are applied to the wall plate and internet connector and remain in place via the adhesive (40). The plug labels (10) and the two complimentary strips (#3) will be attached to the RJ 45 connector at the end of the cable.

Additionally, this product can be used in large businesses like hospitals or data centers and by small businesses and home users as well, anywhere the need arises to have a port or plug and connecting cable accurately identified. For example, the present invention could also be used in connection with power cords, charging cables, air hoses, pipes (copper, PVC etc.) and ropes, to name a few alternatives to ethernet cables and ports.

It should be understood, of course, that the foregoing relates to exemplary embodiments of the invention and that modifications may be made without departing from the spirit and scope of the invention as set forth in the following claims.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A color-coding system for cables and ports comprising:

at least one sheet of material;

wherein said at least one sheet comprises a first adhesive backed colored ID label;

a second adhesive backed colored ID label;

wherein said first adhesive backed colored ID label and second adhesive backed color ID label being of an identical color;

wherein said second ID label is arranged substantially in the center of the first ID label and is precut and readily removable therefrom;

wherein said first label is configured to be affixed to a faceplate of said port;

wherein said faceplate covers an electrical receptacle; and wherein said second label is configured to attach to at least one network/electrical cable, thereby allowing a user to readily match said cable with said faceplate and associated receptacle when making an electrical and/or data connection.

2. The system of claim 1, wherein the first label is arranged to surround said at least one port.

3. The system of claim 2, wherein said first label comprises a plurality of first labels.

4. The system of claim 1, wherein said second label comprises a plurality of second labels.

5. The system of claim 1, further comprising:

adhesive strips configured to be additionally applied to said cable.

6. A system for color-coded cable identification, comprising:

a port label having an adhesive backing and a first color;

a cable plug label having the same first color as the port label; and wherein the port label is configured to be affixed to a network port and the cable plug label is configured to be affixed to a cable plug, enabling visual matching of the cable plug to the correct network port;

wherein the port label comprises a large rectangle with a smaller rectangle pre-cut in the middle;

wherein the cable plug label comprises the smaller rectangle removed from the middle of the port label.

* * * * *